United States Patent [19]
Lee

[11] Patent Number: 5,213,296
[45] Date of Patent: May 25, 1993

[54] STRUCTURE IMPROVED CONNECTING ASSEMBLY FOR TRIPOD

[76] Inventor: Jin T. Lee, Ste. 1, 11F, 95-8 Chang Ping Rd. Sec. 1, Taichung, Taiwan

[21] Appl. No.: 829,270

[22] Filed: Feb. 3, 1992

[51] Int. Cl.⁵ ............................................. F16M 11/38
[52] U.S. Cl. ................................. 248/166; 248/167; 248/170
[58] Field of Search ............... 248/170, 166, 167, 168, 248/188.6, 188.7, 165, 173; 403/93, 92

[56] References Cited

U.S. PATENT DOCUMENTS

| | | | |
|---|---|---|---|
| 4,905,946 | 3/1990 | Wang | 248/170 |
| 5,082,222 | 1/1992 | Hsu | 248/170 |
| 5,102,079 | 4/1992 | Lee | 248/170 |

*Primary Examiner*—Alvin C. Chin-Shue

[57] ABSTRACT

A connecting assembly for a tripod comprises a coupling pipe having a ferruled lower end with three radial lugs extending therefrom, and three legs having clevis connectors on their respective upper ends. The clevis connectors are hingedly attached to respective lugs by pivot pins engaged through registered holes thereon. An elongate locking bar is slidingly disposed in a rear cavity at the base of each connector. A compression spring urges each locking bar forward towards a selected locking recess formed on the periphery of an associated lug. A lever is pivotably secured within each connector, and has a first arm extending through an aperture on a first prong of the connector and a second arm resting against a transverse cavity in an associated locking bar. Each locking bar can be retracted from an engaged recess by squeezing the first arm of an associated lever towards its connector so as to allow the rotation of an associated leg to a new locking position about its lug.

1 Claim, 3 Drawing Sheets

STRUCTURE IMPROVED CONNECTING ASSEMBLY FOR TRIPOD

BACKGROUND OF THE PRESENT INVENTION

The present invention relates to a tripod, and more particularly to an improved connecting assembly for a tripod which can stably support a heavy article and that can be easily adjusted or folded.

The present invention is an improvement on a tripod structure disclosed in U.S. Pat. No. 5,102,079 by the same inventor, wherein the retractable pull rod actuating mechanism for the locking bars of the tripod are replaced by a pivoting lever mechanism as described below.

SUMMARY OF THE PRESENT INVENTION

The principal object of the present invention is to provide an improved connecting assembly for a tripod which can stably support a heavy articles and which has leg supports that can be quickly and reliably adjusted or folded.

In accordance therewith, a tripod assembly comprises a base seat having a central pipe and three lugs projecting radially from the periphery thereof, and three support legs having clevis type connectors on the upper ends thereof. Each support leg is rotatably attached to a corresponding lug by an axle pin engaged through aligned holes in the prongs of the connector and the lug. A spring biased locking bar is slidingly disposed within a cavity in the base of each connector for engagement with a selected locking recess formed on the outer periphery of a corresponding lug. A lever pivotably secured within each connector has an external first arm extending through a side aperture on one prong thereof. A second internal arm of each lever rests against the rear of a transverse cavity formed in an associated locking bar. Each locking bar can be retracted from an engaged locking recess by squeezing the first arm of an associated lever toward its connector against the bias of the compression spring. Thus, each leg can be rotated about an associated lug until the locking bar therein is in alignment with a selected locking recess, with the bar engaging the recess to secure the relative orientation of the leg and lug upon release of the lever.

The connecting assembly for tripods of the present invention has a main object of providing a tripod structure of improved stability and sturdiness, and which is simple and reliable in operation.

A more through understanding of the attainment of the present invention will be obtained by referring to a detailed description of a preferred embodiment thereof, provided below along with accompanying drawings.

DETAILED DESCRIPTION OF THE PREFERRED EMBODIMENT

Figure 1:
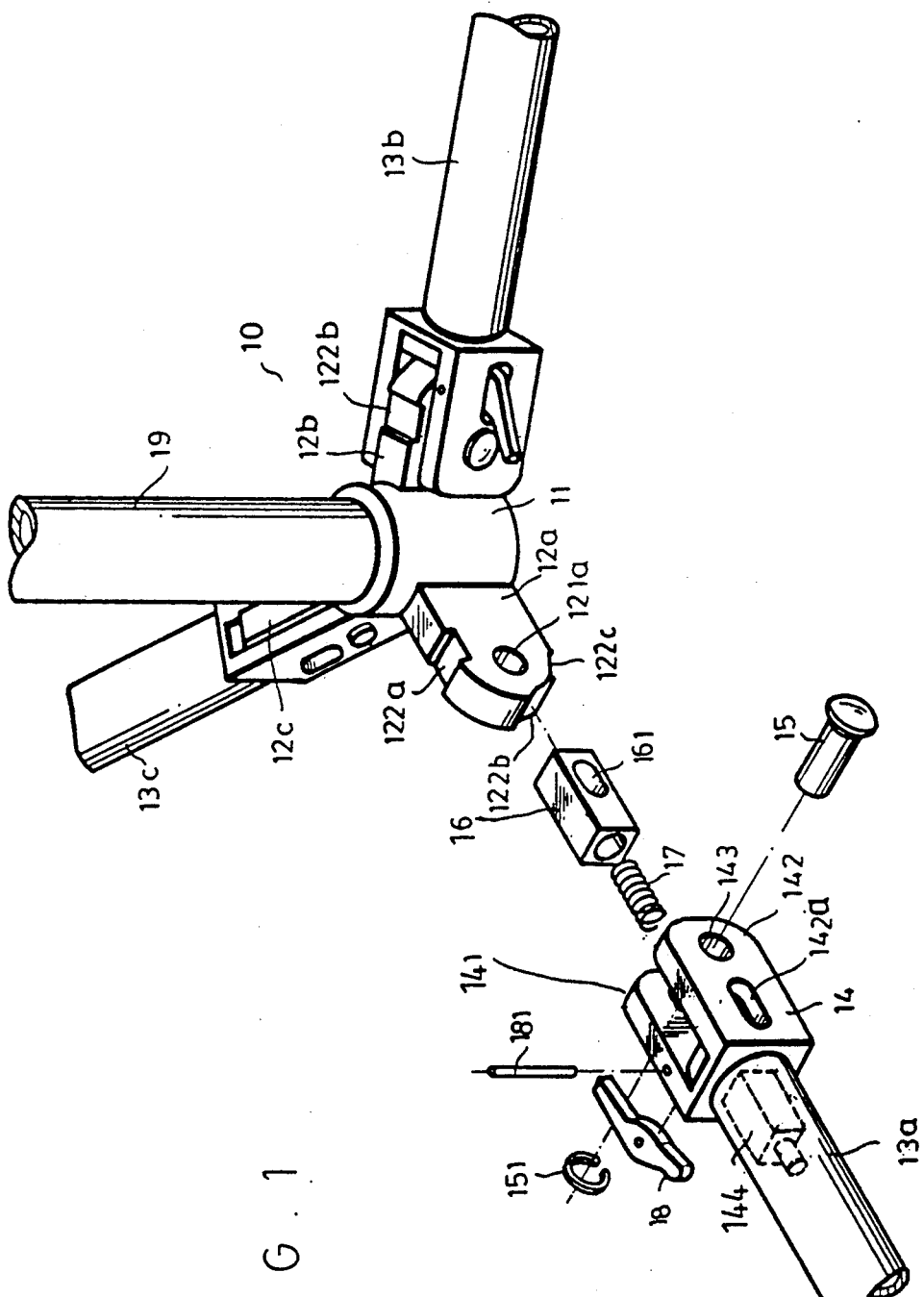
FIG. 1 is a perspective exploded view of the tripod connecting assembly of the present invention.

Referring to FIG. 1 of the drawings, an improved connecting assembly for a tripod 10 comprises a coupling pipe 19 secured on one end to a base seat 11 which has a ferrule with three lugs 12a, 12b, and 12c, three supporting legs 13a, 13b, and 13c, and three clevis type connectors 14 on the upper ends of the respective legs. The three legs 12a, 12b, and 12c are disposed at equally spaced intervals around the periphery of the ferrule, Each lug has a central pivot hole 121a, and three locking recesses 122a, 122b, and 122c formed radially around the rounded periphery thereof. Each connector 14 is secured to an end of a respective pipe by pressure fitting a cylindrical coupler 144 on one end of the connector therein. The other end of each connector 14 carries a pair of spaced, lobe shaped prongs 141, 142 having a penetrating hole 143 formed centrally therethrough.

Figure 2:
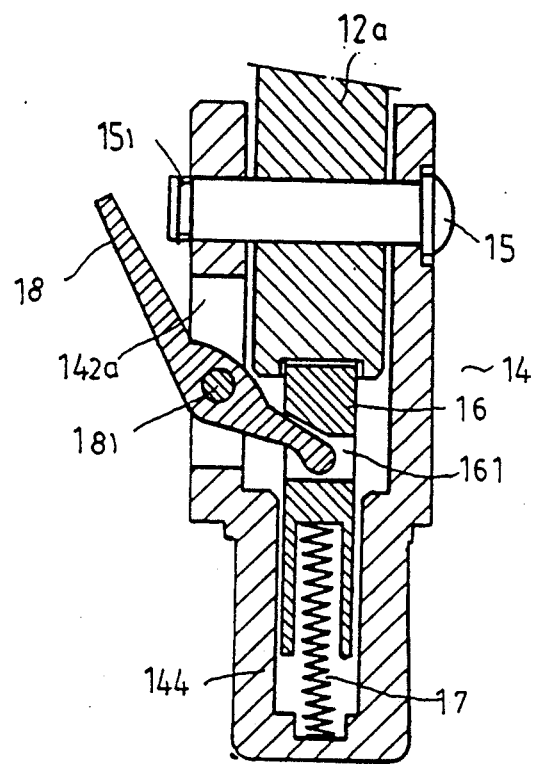
FIG. 2 is a sectional view showing the positioning mechanism between a leg and associated lug of the tripod connecting assembly.
Figure 3:
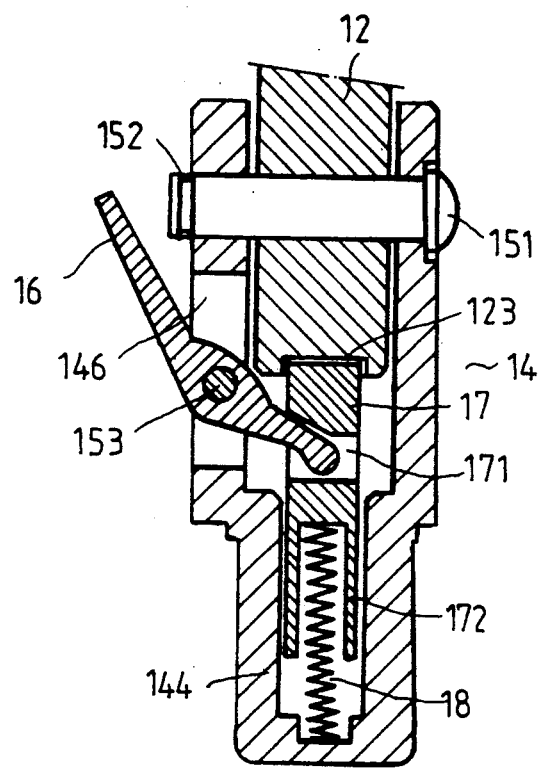

Referring also to FIG. 2, each leg is hingedly attached to a corresponding lug by a pivot pin 15 engaged through holes 143 in the clevis connector thereof and hole 121a in an associated lug. A split retaining ring 151 attached to a free end of each pivot pin's shank secures the pin therein.

An elongate locking bar 16 and compression spring 17 are disposed within a rear cavity 144 formed in the base of each connector. The spring biases the locking bar forward into engagement with a selected locking recess of an associated lug when the legs of the tripod are manipulated. Thus, the direction of the supporting force of each locking bar is along the radial direction of the associated lug to provide a strong and reliable support.

A lever 18 is pivotably disposed within each connector by a pin 181 secured across a periphery of an aperture 142a formed on the side of a first prong 142. Each lever has a first arm extending through the aperture of an associated connector, and a second arm which rests against a rear surface of a transverse cavity 161 in an associated locking bar 16.

Whereby, a used can retract a locking bar rearwards away from an associated lug by squeezing the second arm of an engaged lever towards its connector. Subsequently, a leg could then be rotated about its associated lug until a selected locking recess is in alignment with the locking bar therein. Upon release of the lever, the locking bar travels forward to engage the recess so as to secure the relative orientation of the leg and lug and thereby adjust the height and tilt of the tripod.

It should be noted that the aforedescribed embodiment of the present invention is merely exemplary and is not be construed in a limitative sense. Rather, the actual spirit and scope of the present invention should be determined from the appended claim and its legal equivalents.

I claim:

1. An improved connecting assembly for a tripod comprising:

a base seat having a pipe and a first, second, and third lugs disposed around an outer periphery of said pipe, each said lug having a hole formed therethrough and at least two locking recesses formed spacedly around a periphery thereof;

a first, second, and third support legs having a respective clevis type connector having a pair of prongs and a base on the upper ends thereof, each said connector having a penetrating hole formed through the prongs thereof, a cavity formed in the base thereof, and an aperture formed through a side of a first prong thereof;

a respective axle pin engaging the penetrating hole of each said connector and the hole of a corresponding said lug to hingedly secure each said support leg to a corresponding said lug;

a respective locking bar slidingly disposed in the cavity of each said connector for engaging said at least two locking recesses of a corresponding said lug, each said locking bar having a transverse cavity formed therein communication with the aperture of an associated said connector and defining a rear engagement surface;

a respective spring element disposed in the cavity of each said connector and biasing said locking bar therein forward towards a corresponding said lug;

a respective lever pivotably secured in each said connector, each said lever having a first arm extending outward from the aperture of said connector and a second arm disposed within said connector and engaging the rear surface of the cavity of the locking bar therein;

whereby, each said support leg can be rotated about a corresponding said lug by pivoting the first arm of an associated said lever towards said connector thereof so as to space said locking bar from said lug, and locked into a desired angular position relative to said pipe by aligning said locking bar with a selected said at least two locking recess and releasing the first arm of said lever so that said locking bar travels forward and engages the selected said at least two locking recesses on said lug.

* * * * *